Figure 1:
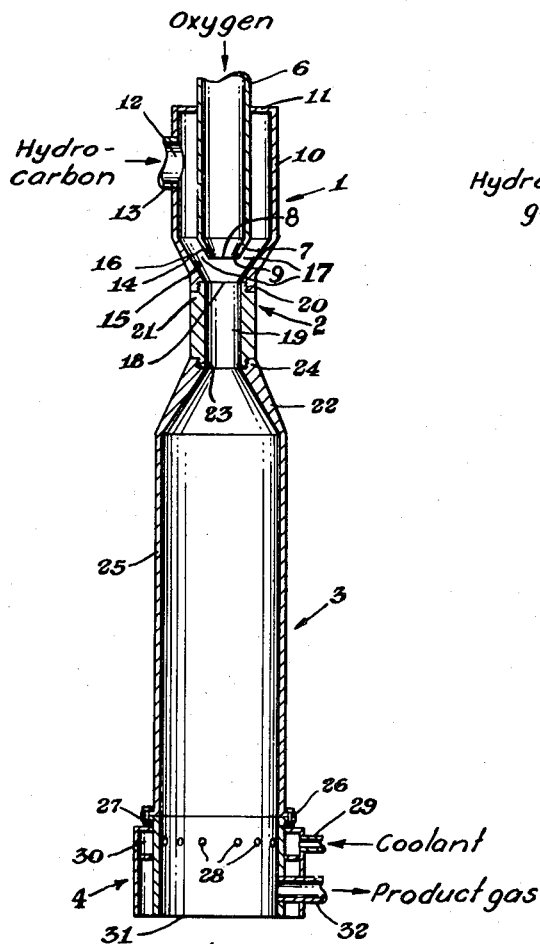

INVENTORS.
Holmes H. McClure
Jack Elliott
BY
ATTORNEY

United States Patent Office 2,945,074
Patented July 12, 1960

2,945,074

PRODUCTION OF ACETYLENE BY THE PARTIAL OXIDATION OF HYDROCARBONS

Jack Elliott and Holmes H. McClure, Lake Jackson, Tex., assignors to The Dow Chemical Company, Midland, Mich., a corporation of Delaware Filed May 5, 1958, Ser. No. 733,039

3 Claims. (Cl. 260—679)

This invention relates to an apparatus for and a method of preparation of acetylene, and more particularly, to an apparatus for and method of preparation of acetylene by the incomplete combustion of a paraffinic hydrocarbon with oxygen.

The production of acetylene by the reaction of a paraffinic hydrocarbon in the gaseous state with oxygen under controlled reaction conditions is known. Basically the process comprises preheating the hydrocarbon and the oxygen separately, mixing the heated gases in a mixing chamber, and discharging the mixed gases into a reactor where a flame is maintained and the reaction is effected. While the reaction is simple, the operation of the process under conditions which will give good yields of acetylene is difficult. It is known that preheating the hydrocarbon gas and oxygen to a high temperature will give better results. However, due to flashbacks into the mixing zone and preignition, preheating has been limited to temperatures in the range of 500° to 600° C. The use of nonmetallic surfaces for the inside of at least portions of the surfaces in contact with the reactants and other specialized equipment has been suggested to enable these gases to be preheated to a higher temperature without adverse effects from the equipment in contact with the gases. This specialized equipment is expensive, difficult to construct, and involves considerable maintenance.

In all of the prior art processes, even in those using specialized equipment, some device such as a porous or perforated plate must be used between the mixing chamber and the reactor to prevent flashbacks. The known devices of this kind tend to promote carbon formation and become more or less plugged by the carbon, thus requiring a periodic shutdown for cleaning.

Also, in the prior art processes, the yield of acetylene obtained in the product gas is in the range of from 7 to about 8.5 volume precent. Since the volume percent of the acetylene in the product gas leaving the reactor is relatively small an increase in the acetylene content of ½ percentage point or more greatly affects the economy of the process.

It is, therefore, a principal object of this invention to provide an apparatus and a method for the preparation of acetylene by incomplete combustion where the hydrocarbon gas and oxygen can be preheated up to 1200° C. without the danger of preignition or flashback. A further object is to provide a process and apparatus which does not require a perforated or porous device between the mixing chamber and the reactor for the control of flashback. Another object is to provide a process which produces a higher yield of acetylene in the product gas than heretofore possible. Still other objects will be apparent from the following description of the invention.

In accordance with the invention the paraffinic hydrocarbon from which the acetylene is to be formed and oxygen are each separately heated to a temperature of at least 700° C. and not more than 1200° C. Each of the heated gases is then injected individually into a mixing chamber of circular cross section. The hydrocarbon gas is injected into the mixing chamber along its longitudinal axis as a hollow frustro-conical shaped gaseous stream converging at an angle of 10° to 45° to the longitudinal axis as it enters the chamber preferably at about sonic velocity. The oxygen gas stream is also injected into the mixing chamber as a gaseous stream moving preferably at about sonic velocity as it enters the chamber, the injection being made into the hollow portion of the hydrocarbon stream. The injected hydrocarbon and oxygen gases enter the mixing chamber initially as two streams one within the other and pass through the mixing chamber preferably at about sonic velocity in from 0.0001 to 0.002 second while undergoing mixing therein. The resulting mixture is discharged into one end of a cylindrical reactor in longitudinal axial alignment with the longitudinal axis of the mixing chamber, the reactor having a diameter such that the ratio of the diameter of the reactor to the mixing chamber is in the range of 2.5:1 to 5:1 and a length of 3 to 7 times its diameter. The hot gases produced by the reaction which ensues in the reactor issue from the opposite end of the reactor and are then quenched by admixture with a cooling medium. From the cooled gas mixture thus produced, a high yield of acetylene is obtained on separating it from the gas mixture.

It has been discovered that by controlling the method of injecting the hydrocarbon gas and oxygen into the mixing chamber, the length and diameter of the mixing chamber and of the reactor, and the velocity of the gases in the apparatus as above briefly described, over 9 percent acetylene in the product gas may be obtained. The flashback difficulty which has plagued the prior art reactors is eliminated and no perforated or porous baffle has to be used between the mixer and the reactor. The velocities of the hydrocarbon gas and oxygen entering the mixing chamber and the velocity of the mixture in the mixing chamber must be at least equal to 90 percent of sonic velocity and preferably at sonic velocity.

The invention may be further explained by reference to the accompanying drawing which illustrates largely diagrammatically an apparatus for the partial oxidation of paraffinic hydrocarbons and oxygen according to the invention.

Figure 3:
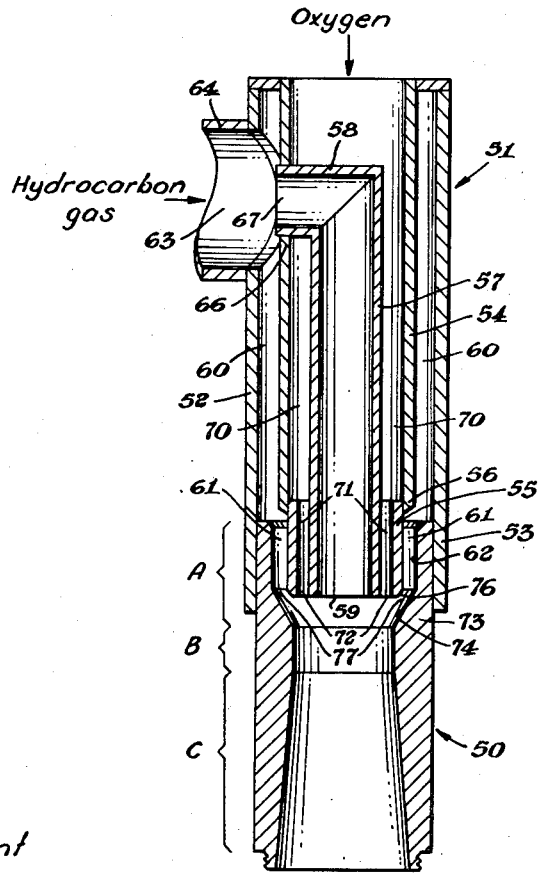
Figure 2:
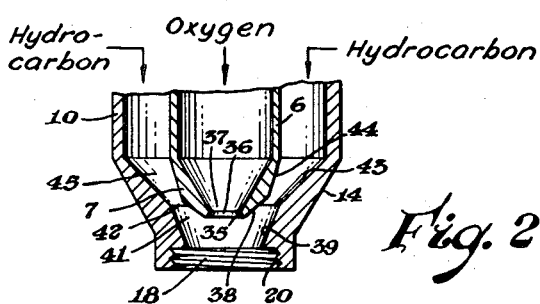

In the drawing, Fig. 1 is a vertical sectional elevation of the apparatus. Fig. 2 is a fragmentary sectional elevation of a modification of the discharge ports of the nozzle assembly portion of Fig. 1. Fig. 3 is a sectional elevation of a modification of the nozzle assembly and mixing chamber portion of Fig. 1.

As shown in Fig. 1 the apparatus comprises 4 principal elements viz: a nozzle assembly indicated generally by numeral 1, a mixing chamber 2, a reaction vessel 3, and a quenching section 4.

The nozzle assembly of Fig. 1 comprises an oxygen inlet tube 6 extending downwardly with its lower end 7 having inwardly sloping walls to provide a discharge port 8 of a restricted cross sectional area. The center of discharge port 8 is in alignment with the longitudinal axis of tube 6. As shown, the wall 9 forming the discharge port is parallel to the longitudinal axis of the tube 6. A portion of inlet tube 6 is surrounded by an outer member 10, the upper portion having generally the form of a cylinder the top of which is closed with annular member 11. The inner periphery of member 11 is joined to the outer wall of tube 6, as by welding. An opening 12 provided in the side of the cylinder is connected to a hydrocarbon gas inlet line 13. The lower portion 14 of outer member 10 is conically shaped with the inner wall 15 sloping inwardly at an angle of 10° to 45° with respect to the longitudinal axis of the outer member forming a frusto-conical shaped inner surface. The oxygen tube 6 terminates within the frusto-conical shaped portion of the outer member 10. The outer wall 16 of lower end 7 of the oxygen tube and the inner wall 15 of the frusto-conical shaped portion of member 10 which are shown as parallel with respect to each other form an annular discharge port 17 for the hydrocarbon gas stream. The bore 18 of the lower end of the conical shaped portion of member 10 is in alignment with bore 19 of the mixing chamber and of the same size so that a smooth ridge-free passage is provided from the nozzle assembly into the mixing chamber. As shown the conical portion of member 10 is provided with a threaded counter bore 20 which is screwed on an externally threaded boss 21 of the mixing chamber and thus used as a means of attaching the nozzle assembly to the mixing chamber. Other means of attachment such as welding may be used or the mixing chamber and the outer member 10 may be constructed from one piece by first boring the piece with a bore of that required for the mixing chamber and then enlarging the bore to obtain the frusto-conical shaped section formed by inner wall 15 and the bore for the upper portion of the outer member. The lower end of the mixing chamber is attached to an upper section 22 of reaction vessel 3, the section being conically shaped with the inner wall sloping outwardly as shown at an angle not greater than 45 degrees with respect to the longitudinal center line of the vessel. The mixing chamber may be attached as by welding or other means but is shown attached by screwing an externally threaded boss 23 on the lower end of the mixing chamber into a threaded counter bore 24 of section 22 of the reaction vessel. With the exception of the conically shaped upper section 22 which is used for attaching the reaction vessel 3 to the mixing chamber, the major portion 25 of the reaction vessel 3 is cylindrically shaped having an inner diameter which has a definit relationship to the size of the bore of the mixing chamber. A flange 26 at the lower end of section 25 is employed as a means of connecting the reaction vessel to quenching section 4 which has a corresponding flange 27. The quenching section near the top is perforated with holes 28 being equally spaced around it through which coolant may be sprayed into the section. The coolant is supplied by means of an inlet 29 to a conduit 30 on the outside of the quench section which distributes the coolant to the holes. The bottom of the quench section is closed by a plate 31. Near the bottom of the quench section an outlet 32 is provided for the product gas and quenching liquid.

In Fig. 2 a fragmentary sectional elevation is shown of a modified nozzle assembly shown in Fig. 1 where the discharge ports for the oxygen and hydrocarbon streams are of the diverging nozzle type. The wall 35 forming the oxygen discharge port 36 slopes outwardly providing a frusto-conically shaped discharge port with the smallest cross sectional area or throat of the port being at its entrance 37 and gradually increasing. The hydrocarbon discharge port is obtained by having the inner wall of section 14 and the outer wall of lower end of the oxygen tube slope at angles divergent to each other. The lower portion 38 of the outer wall of end 7 and the lower portion 39 of the inner wall of section 14 which are divergent with respect to each other form the nozzle type port 41 having the smallest cross sectional area at the throat 42. The slope of the upper portion 43 of the outer wall of end 7 of the oxygen tube and the slope of upper portion 44 of the inner wall of end 7 are shown as converging with respect to each other and provide an entrance 45 to the port. The divergence of the walls with respect to the longitudinal axis of the ports from the throat of the port should generally not exceed 7 degrees so that the diverging section of the port acts as a diffuser in a manner similar to that of a diffuser cone on "De Laval nozzles" which are used in turbines. In the converging type of the entrance to the ports e.g. 45, any angle of convergence may be used or, for example, the entrance may be formed by having the outer wall 44 of the oxygen tube and inner 43 of section 14 parallel.

A modification of the nozzle assembly and mixing chamber arrangement of Fig. 1 is shown in Fig. 3. In the modification of the nozzle assembly and mixing chamber arrangement, part of the elements of the nozzle assembly are made as an integral part of the mixing chamber as shown for convenience in construction. The member which comprises the mixing chamber and part of the nozzle is indicated generally by numeral 50. As shown member 50 is divided into three sections indicated as section A, section B, and section C. Sections B and C comprise the mixing chamber and section A is part of the nozzle assembly indicated generally as 51. In addition to section A of member 50, the nozzle assembly 51 comprises an outer tube 52 which at its lower part 53 encompasses and is attached to section A of member 50; an intermediate tube 54 which at its lower end part 56 encompasses and is attached to a short extension tube 55 which extends into section A; and a center tube 57 having a 90 degree bend 58 at one end and a discharge port or open end 59 at the other. Intermediate tube 54 and extension tube 55 are concentrically disposed within outer tube 52 thereby providing an annular flow channel 60 between intermediate tube 54 and outer tube 52 (connected as a continuous passageway) and a more restricted annular flow chanel 61 between the outer wall of extension tube 55 and inner wall 62 of section A of member 50. An opening 63 through the wall of outer tube 52 connected to hydrocarbon inlet 64 provides an entrance to flow channel 60. Center tube 57 is concentrically disposed within intermediate tube 54 and extension tube 55. Bend 58 of center tube 57 projects through the intermediate tube 54 at its upper end portion 66 to provide an inlet 67 into the center tube. An annular flow channel 70 is provided between the center tube and the intermediate tube (connected as a continuous passageway) and a more restricted annular flow channel 71 between the center tube and extension tube 55. Flow channel 71 terminates in an annular discharge port 72. Center tube 57 and extension tube 55 extend into a converging frusto-conical shaped section 73 of section A. As in the nozzle described in Figure 1, converging section 73 has a downwardly sloping inwardly tapered inner wall 74 which forms an angle in the range of 10° to 45° with respect to the axial center line. The lower end of extension tube 55 has an outside bevel 76 which slopes downwardly and inwardly. The opening between bevel 76 and tapered inner wall 74 forms an annular inwardly directed discharge port 77 completely surrounding discharge port 72.

In carrying out the method of the invention with the apparatus shown in Fig. 1, oxygen previously preheated is introduced into the oxygen inlet tube 6 and is thereby injected into the mixing chamber through discharge port 8. The hydrocarbon gas also previously preheated is fed into the mixing nozzle through inlet 13 from which it flows down in a stream surrounding the oxygen tube 6 and is thereby injected into the mixing chamber through the annular port 17. By passing the hydrocarbon gas through the space between the outer wall of lower end 7 of the oxygen inlet tube and the sloping inner wall 15 of outer member 10, a hydrocarbon stream having a shape of a hollow frustum is obtained which converges at an angle with respect of the axial center line equal to that of slope of inner wall 15. The oxygen being discharged through port 8 is introduced into the center of the hollow converging hydrocarbon stream. Thus the oxygen is completely surrounded by the hydrocarbon stream as the streams are injected into the mixing chamber. Upon being injected into the mixing chamber 2 the heated hydrocarbon gas and heated oxygen are thoroughly intermixed as they pass through the mixing chamber prior to being discharged into reaction vessel 3. In reaction vessel 3 the mixed gases are ignited forming a flame which maintains itself and the partial oxidation results thereby producing acetylene as the gases pass through the reactor. Upon leaving the reaction vessel, the reaction products are quenched by the injection of a coolant, such as water, through holes 28 in section 4. The coolant decreases the temperature of the gaseous products and thus prevents the decomposition of the acetylene in them.

The operation of the apparatus with a nozzle assembly shown in Fig. 3 is similar to that described above except that the oxygen stream is sandwiched in between two streams of hydrocarbon gas as the streams are injected into the mixing chamber. Oxygen enters the nozzle assembly in intermediate tube 54 and flows in channel 70 and 71 discharging through port 72 into converging section 73 as an annular stream. The hydrocarbon gas is introduced into the nozzle assembly through opening 63. Part of the hydrocarbon gas enters center tube 57 through opening 67 and discharges through port 59 into the mixing chamber. The remaining part flows in annular flow channels 60 and 61. The annular shaped hydrocarbon gas stream flowing in flow channel 60 passes into flow chanel 61 and into converging section 73 of the nozzle. Upon entering the converging section, the annular gas stream will be directed inwardly by tapered wall 74 of converging section 73. Thus, this portion of the gas stream is injected into the mixing chamber through annular port 77 as a converging hollow stream or hollow frustum-shaped stream completely surrounding the oxygen stream. The remainder of the process is the same as previously described.

In the injection of the gas streams in the mixing chamber, it is essential that the individual hydrocarbon stream and the oxygen stream be injected into the mixing chamber at a velocity at least equal to 90 percent of the sonic velocity and preferably at sonic linear velocity through their respective ports. It is also critical that the oxygen be discharged into a hollow hydrocarbon stream converging at an angle in the range of 10° to 45°, preferably 25° to 35°. By maintaining the high velocity at the ports and having the hydrocarbon stream enter at the correct angle, the gases may be preheated to temperatures up to 1200° C. and the streams mixed without obtaining ignition at the point of contact of the two streams.

In addition to the velocities and method of injecting the gas stream into the mixing chamber, the velocity of the hydrocarbon gas and oxygen in the mixing chamber must be also at least equal to 90 percent sonic velocity to obtain a high percentage of acetylene in the product gas. Thus, the cross-sectional area of the mixing chamber used with respect to the area of the ports of the nozzle assembly is such that preferably about sonic velocity is obtained in the mixing chamber as well as in the discharge ports during operation on supplying the gases at a sufficient rate. Also, the mixing chamber is relatively short so that a retention time of from 0.0001 to 0.002 second is obtained.

The mixing chamber may be either a straight tube, a diverging nozzle, or a combination of the two. With a straight tube, as shown in Fig. 1, a length in the range of 2 inches to 12 inches may be used. A mixing tube less than 2 inches while operative will result in the retention time of less than 0.0001 second and thus decreased yields are obtained. Under special conditions a straight tube mixing chamber longer than 12 inches may be used; however, if the length is extended much over 12 inches, a retention time of longer than 0.002 second is obtained and ignition within the mixing tube may take place resulting in overheating of the tube. Generally, the length of the mixing chamber when cylindrical is in the range of 4 inches to 12 inches, preferably from 4 to 8 inches.

When a diverging nozzle type of a mixing chamber is used, the divergence of the walls with respect to the longitudinal axis is in the range of 2 to 7 degrees so that in effect a divergent nozzle of the "De Laval" type is obtained. This type of a mixing chamber would be obtained by abutting section C as shown in Fig. 3 to section A and omitting the portion of the mixing chamber designated as section B. Since super sonic gas velocities may be obtained in the nozzle type mixing chamber, the length of this chamber may be greater than for a straight tube. While good yields with a relatively long divergent nozzle type chamber can be obtained, it may be difficult to control and maintain the flame within the reactor. Thus, even when a divergent nozzle is employed as a mixing chamber, a length greater than 12 inches is seldom used. Generally, the length of the divergent nozzle type of a mixing chamber is the same as for a straight tube being in the range of from 4 to 12 inches, preferably from 4 to 8 inches. A nozzle shorter than 2 inches is not desirable, since a decrease in yield is obtained as with a straight tube.

The mixing chamber may be made up of a straight tube section and a divergent nozzle section as shown in Fig. 3 as section B and C respectively. Generally when this type of a mixing chamber is employed, the chamber consists of a straight tube of from 1 to 7 inches in length and a diverging section of from 2 to 8 inches in length.

The term "sonic velocity," as herein used in reference to a discharge port or a mixing chamber which are of the diverging nozzle type, means the gas velocity at the smallest cross-sectional area of the diverging port or mixing chamber or the throat of the port or mixing chamber. Thus, in the diverging portion of the port or mixing chamber super sonic velocity may be obtained. The term "diameter," as herein applied to these ports and mixing chambers, means the throat diameter. When the term "diameter" is used in reference to the reaction vessel, the diameter meant is the diameter of the major portion of the reaction vessel as indicated by numeral 25 in Fig. 1.

Further, to obtain high yields of acetylene, a definite relationship exists between the diameter of the mixing chamber, or the throat of the diverging nozzle type mixing chamber, and the diameter of the reactor. The ratio of the reactor diameter to the diameter of the mixing chamber must be in the range of 2.5:1 to 5:1, preferably in the range of 3:1 to 4:1. When this ratio of the diameters is used, a proper velocity within the reactor is obtained. In addition to this relationship between the diameters of the reactor and the mixing chamber, the length of the reactor must be from 3 to 7 times its diameter, preferably 4 to 6 times the diameter, to provide the proper retention time in the reactor. The length of the reactor thus expressed as the function of its diameter includes the upper section 22 of the reactor which is used as a means of attaching the mixing chamber to the reactor. The length of this upper section alone is relatively immaterial. The inner wall of this upper section may slope inwardly at an angle in the range of 8 to 45 degrees with respect to the longitudinal axis of the reactor. Normally, the angle is in the range of 9 to 15 degrees.

In the process the hydrocarbon gas and oxygen are preheated separately to a temperature of 700° to 1200° C., preferably in the range of 750° to 900° C. The mixture is self-igniting and when there is no flame in the reactor the mixture of the hydrocarbon gas and oxygen may ignite upon entering the reactor. It is believed that when these gases are intermixed at these high temperatures and introduced into the mixing chamber according to the invention they will not ignite until a lapse of a certain length of time. Thus, by maintaining a short mixing chamber and sufficiently high velocity so that the retention time in the mixing tube is less than 0.002 second, preignition as well as flashback is prevented. However, when the mixture enters the reactor where a longer contact time is obtained, it will ignite. Thus, in start-ups sometimes it may not be necessary to initially ignite the mixture in the reactor provided the gases are suitably preheated.

Any paraffinic hydrocarbon which can be gasified or vaporized can be used. Paraffinic hydrocarbons which are normally liquids at atmospheric temperature and pressure may be employed after they are vaporized. Lower hydrocarbon gases, such as methane, ethane, and propane, are preferred and are most generally used, especially methane. Pure oxygen or a commercial grade of oxygen preferably containing 95 percent of oxygen may likewise be used. The amount of oxygen employed is normally less than the amount that would be required for complete combustion of the hydrocarbon. For methane, the molar ratio of oxygen to methane generally employed is in the range of 1:1.5 to 1:3, preferably in the range of 1:2 to 1:2.5.

Although the reactor may be operated under an absolute pressure of from 0.1 to 1.5 atmospheres, the reactor is generally operated close to atmospheric pressure. Under a reduced pressure, higher yields are obtained, but the cost of the equipment necessary makes it uneconomical. At pressures above 1.5 atmospheres, the yields rapidly decrease.

The following example further illustrates the invention.

*Example I*

An apparatus similar to the one shown in Figure 1 was used for the production of acetylene by incomplete combustion of methane with oxygen. In the nozzle assembly the frusto-conical portion of the nozzle of the hydrocarbon discharge port, e.g. inner wall 15 in Fig. 1, had a slope of 30 degrees with respect to the longitudinal axis of the nozzle assembly. The mixing chamber had an inside diameter of 0.75 inch and was 4 inches long. The reactor had an inside diameter of 2.5 inches and was 16 inches long. The length of the diverging section attaching the mixing tube to the reactor was around 4 inches. A water spray was employed for the quenching. A paraffinic hydrocarbon gas consisting essentially of methane was used. This hydrocarbon gas contained 98 volume percent of methane and the remainder nitrogen, ethane, propane, and butane. The oxygen stream used contained 99.5 volume percent of oxygen.

The oxygen and hydrocarbon gas were separately preheated to 800° C. and charged into the nozzle assembly in a molar ratio of 1:2 at a gauge pressure of around 30 pounds per hour per square foot, the mass velocity of the oxygen passing through the discharge port was 275,000, for the hydrocarbon gas 100,000, and 202,000 when combined in the mixing tube. The pressure in the reactor was substantially atmospheric.

The analysis of the product gas leaving the quench section is shown in the table below:

| | Volume percent |
|---|---|
| Acetylene | 9.3 |
| Methylacetylene | 0.2 |
| Diacetylene | 0.4 |
| Vinylacetylene | 0.03 |
| Hydrogen | 56.5 |
| Methane | 7.1 |
| Ethane | 0.2 |
| Oxygen | 0.5 |
| Nitgrogen | 0.2 |
| Carbon monoxide | 22.1 |
| Carbon dioxide | 2.2 |

Two larger units were constructed. In the construction of the large units, the ratio of the diameter of the reactor to the mixing chamber and the length of the reactor to its diameter were varied. It was found that to obtain from 8.5 to 10.5 percent acetylene in the product gas the ratio of the diameter of the reactor to the mixing chamber had to be in the range of 2.5:1 to 5:1 and the length of the reactor in the range of 3 to 7 times its diameter.

The length of the mixing chambers for these two larger units also varied from 1 to 18 inches and different methods for the injection of the hydrocarbon gas and oxygen in the mixing chamber were used. Preignition occurred in a straight tube 18 inches long at a point about 12 inches from the entrance of the gases. In a diverging nozzle type tube of the same length this difficulty was not experienced.

In the larger units as well as the unit given in Example I decreased yields and flashbacks occurred if the velocity of the individual streams through the discharge ports of the nozzles was not at least 90 percent of sonic velocity or if the oxygen stream was not injected into a hydrocarbon stream converging at an angle of from 10 to 45 degrees.

What is claimed is:

1. A process for the production of acetylene by partial oxidation of a paraffinic hydrocarbon with oxygen, which comprises separately heating the paraffinic hydrocarbon and oxygen to a temperature of at least 700° C. and not more than 1200° C., injecting the heated paraffinic hydrocarbon and oxygen into a mixing chamber of circular cross section and a given diameter, said hydrocarbon stream being injected in said mixing chamber as a hollow frusto-conical shaped gaseous stream converging at an angle of 10° to 45° at a velocity equal to at least 90 percent of sonic velocity and said oxygen stream being injected in said mixing chamber as a gaseous stream within the hydrocarbon stream at a velocity equal to at least 90 percent of sonic velocity, confining the injected hydrocarbon and oxygen gases in the mixing chamber to pass said gases through the mixing chamber at a velocity equal to at least 90 percent of sonic velocity for a length of time of from 0.0001 to 0.002 second to mix the gases, subsequently passing the mixed hydrocarbon gas and oxygen gas into a cylindrical reactor having a diameter such that the ratio of the diameter of the reactor to the diameter of the mixing chamber is in the range of 2.5:1 to 5:1 and a length of 3 to 7 times its diameter to react the hydrocarbon with the oxygen, and quenching the resulting reaction gases with a cooling medium at the exit of the reactor.

2. A process for the production of acetylene by partial oxidation of a paraffinic hydrocarbon with oxygen, which comprises separately heating the paraffinic hydrocarbon and oxygen to a temperature in the range of 750° to 900° C., injecting the heated paraffinic hydrocarbon and oxygen into a mixing chamber of circular cross section and a given diameter, said hydrocarbon stream being injected in said mixing chamber as a hollow frusto-conical shaped gaseous stream converging at an angle of 25° to 35° at about sonic velocity and said oxygen stream being injected in said mixing chamber as a gaseous stream within the hydrocarbon stream at about sonic velocity, confining the injected hydrocarbon and oxygen gases in the mixing chamber to pass the gases through the mixing chamber at about sonic velocity for a length of time from 0.0001 to 0.002 second to mix the gases, subsequently passing the mixed hydrocarbon gas and oxygen gas through a cylindrical reactor having a diameter such that the ratio of the diameter of the reactor to the diameter of the mixing chamber is in the range of 3:1 and 4:1 and a length of 4 to 6 times its diameter to react the hydrocarbon with the oxygen, and quenching the resulting reaction gases with a cooling medium at the exit of the reactor.

3. A process according to claim 2 wherein the hydrocarbon gas comprises essentially methane.

References Cited in the file of this patent

UNITED STATES PATENTS

| 2,664,450 | Sachsse et al. | Dec. 29, 1953 |
| 2,765,359 | Pichlet et al. | Oct. 2, 1956 |
| 2,790,838 | Schrader | Apr. 30, 1957 |
| 2,833,839 | Lehrer | May 6, 1958 |

FOREIGN PATENTS

| 709,035 | Great Britain | May 12, 1954 |